(12) United States Patent
Hunt et al.

(10) Patent No.: US 9,134,422 B2
(45) Date of Patent: Sep. 15, 2015

(54) GENERATION AND DETECTION OF FREQUENCY ENTANGLED PHOTONS

(75) Inventors: Jeffrey H. Hunt, Thousand Oaks, CA (US); Barbara A. Capron, Sammamish, WA (US); Claudio G. Parazzoli, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1758 days.

(21) Appl. No.: 12/418,568

(22) Filed: Apr. 4, 2009

(65) Prior Publication Data

US 2010/0252745 A1  Oct. 7, 2010

(51) Int. Cl.
*G01J 1/42* (2006.01)
*G01S 17/89* (2006.01)
*G01S 7/486* (2006.01)
*G01S 17/10* (2006.01)

(52) U.S. Cl.
CPC .............. *G01S 17/89* (2013.01); *G01S 7/4861* (2013.01); *G01S 17/107* (2013.01)

(58) Field of Classification Search
USPC ....................................................... 250/372
See application file for complete search history.

(56) References Cited

U.S. PATENT DOCUMENTS 3,474,414 A * 10/1969 Lenz ............................. 714/815
6,028,910 A * 2/2000 Kirchner et al. ................ 378/22
2005/0006593 A1   1/2005 Kastella et al.
2007/0296953 A1  12/2007 Allen et al.
2009/0194702 A1 * 8/2009 Meyers et al. ................ 250/393

OTHER PUBLICATIONS

Pittman et al. Two-photon geometric optics, Physical Review A vol. 53, No. 4 (Apr. 1996), pp. 2804-2815.*
Pittman et al., "Two photon geometric optics" The American Physical Society, vol. 53, No. 4, 1996, pp. 2808 and 2813-2814.
de Dood et al. "Nonlinear Photonic Crystals as a Source of Entangled Photons," PhysRevLett.93.050405, 2004).
Sharping et al, "Quantum-correlated twin photons from microstructure fiber," Optics Express 3086, vol. 12, No. 14, 2004.
Stevenson et. al., "A semiconductor source of triggered entangled photon pairs" Nature, vol. 439, pp. 179-182, 2006.
Pelton et al., "Bright, single-spatial-mode source of frequency non-degenerate, polarization-entangled photon pairs using periodically poled KTP" Optical Express 3573, vol. 12, No. 15, 2004.
Jeffrey H. Shapiro, "Semiclassical versus Quantum Imaging in Standoff Sensing," Center for Extreme Quantum Information Theory, Research Laboratory of Electronics at MIT, Oct. 1, 2007, XP002517264.

(Continued)

*Primary Examiner* — David Porta
*Assistant Examiner* — Shun Lee
(74) *Attorney, Agent, or Firm* — Hugh P. Gortler

(57) ABSTRACT

An ultraviolet laser generates a coherent beam, which is downconverted to produce pairs of frequency-entangled photons. For each entangled pair, a first photon is sent along a first path and a second photon is sent along a second path. A first detector detects those photons sent along the first path, and a second detector detects those photons sent along the second path. The detection is performed in a single photon regime. Coincidence counting is performed on outputs of the detectors, including comparing leading edges on outputs of the first and second detectors within a time window.

20 Claims, 5 Drawing Sheets

(56) References Cited

OTHER PUBLICATIONS

Jeffrey H. Shapiro, "Ghost Imaging: From Quantum to Classical to Computational," Center for Extreme Quantum Information Theory, Research Laboratory of Electronics at MIT, Nov. 17, 2008, pp. 1-29, XP002517265.

Lugiato et al., "Quantum imaging;" Journal of Optics B: Quantum and Semiclassical Optics, Institute of Physics Publishing, Bristol, GB, vol. 4, No. 3, Jun. 1, 2002, pp. S176-S183, XP020081868, ISSN: 1464-4266.

* cited by examiner

FIG. 3
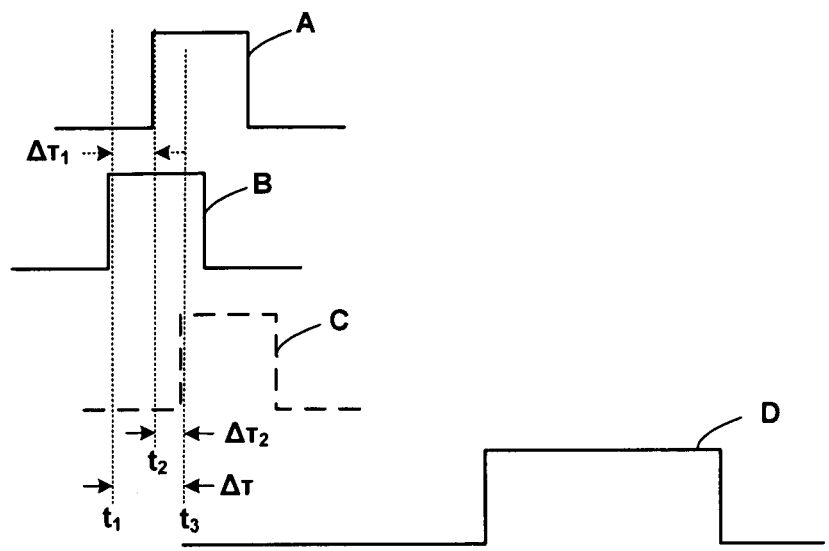
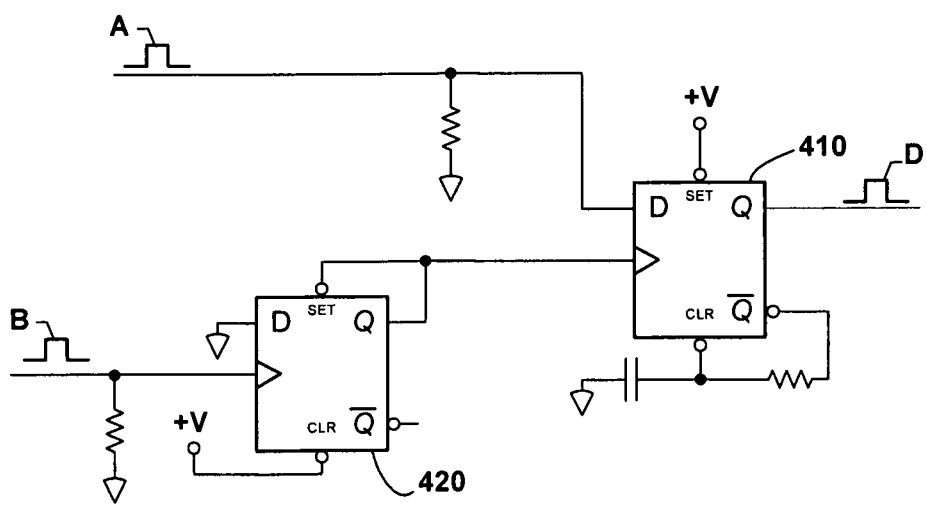
FIG. 4

FIG. 5

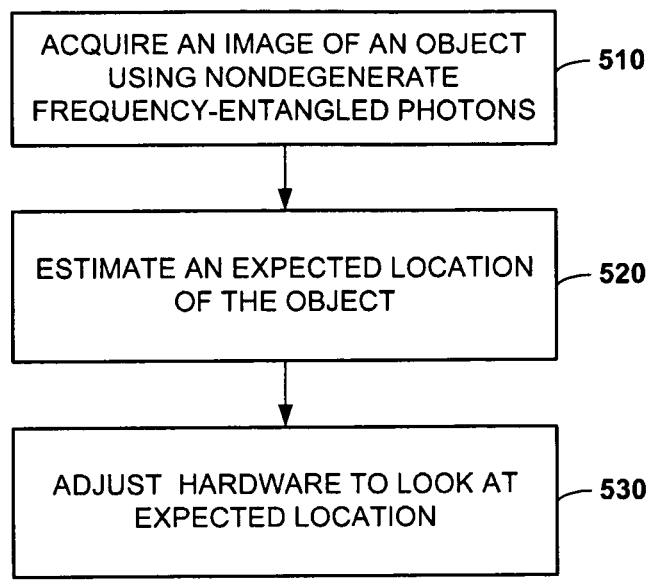

- ACQUIRE AN IMAGE OF AN OBJECT USING NONDEGENERATE FREQUENCY-ENTANGLED PHOTONS — 510
- ESTIMATE AN EXPECTED LOCATION OF THE OBJECT — 520
- ADJUST HARDWARE TO LOOK AT EXPECTED LOCATION — 530

FIG. 6

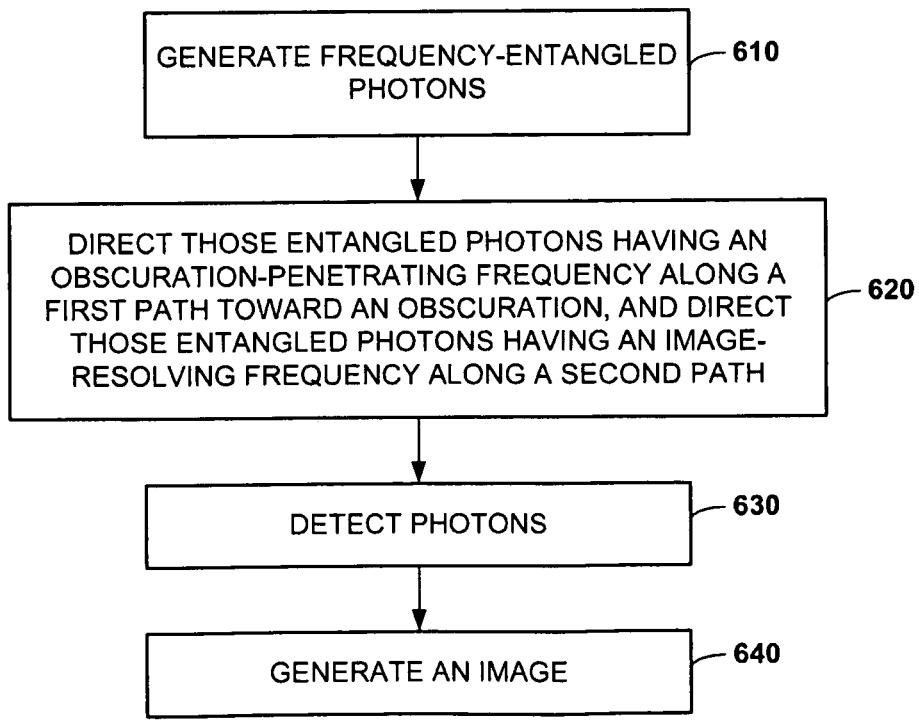

- GENERATE FREQUENCY-ENTANGLED PHOTONS — 610
- DIRECT THOSE ENTANGLED PHOTONS HAVING AN OBSCURATION-PENETRATING FREQUENCY ALONG A FIRST PATH TOWARD AN OBSCURATION, AND DIRECT THOSE ENTANGLED PHOTONS HAVING AN IMAGE-RESOLVING FREQUENCY ALONG A SECOND PATH — 620
- DETECT PHOTONS — 630
- GENERATE AN IMAGE — 640

GENERATION AND DETECTION OF FREQUENCY ENTANGLED PHOTONS

BACKGROUND

Quantum entanglement is a quantum mechanical phenomenon in which the quantum properties of two or more objects are described with reference to each other, even though the individual objects may be spatially separated. Two photons, A and B, are said to be entangled and form a bi-photon system when, if one property of the photon A is known, then the corresponding property of photon B is also known. For example, if two photons are prepared in a polarization entangled state, and one of the photons is observed to have a specific polarization, then the other photon will have a known polarization.

Systems for generating and detecting entangled photons have been proposed. For example, a Ti-Saphhire laser generates a coherent beam, non-linear crystals downconvert the coherent beam into frequency-entangled photons, and non-linear crystals then upconvert the entangled photons to a frequency suitable for detection. Those photons having a first state are sent along a first path, and those photons having a second state are sent along a second path. A bucket detector detects those photons sent along the first path, and a second detector detects those photons sent along the second path. Coincidence-measurements are performed on the photons detected by the first and second detectors. The bucket detector is operated as a time gate to consider the coincidences.

SUMMARY

According to an embodiment herein, a method includes using an ultraviolet laser to generate a coherent beam. The coherent beam is downconverted to produce pairs of frequency-entangled photons. For each entangled pair, a first photon is sent along a first path and a second photon is sent along a second path. A first detector detects those photons sent along the first path, and a second detector detects those photons sent along the second path. The detection is performed in a single photon regime. Coincidence counting is performed on outputs of the detectors, including comparing leading edges on outputs of the first and second detectors within a time window.

According to another embodiment herein, a system comprises a laser-based system for generating frequency-entangled photon pairs. For each pair, a first photon is sent down a first path and a second photon is sent down a second path. The system further comprises a first photon detector for detecting individual photons sent down the first path; a second photon detector for detecting individual photons sent down the second path; and a circuit, responsive to outputs of the detectors, for counting coincidences of the photon pairs. The circuit determines coincidence by comparing leading edges on outputs of the first and second detectors within a time window.

BRIEF DESCRIPTION OF THE DRAWINGS

FIG. 3 is an illustration of a timing diagram for determining coincidence of detected photons.

FIG. 4 is an illustration of a coincidence counter.

FIG. 5 is an illustration of a method of performing object tracking.

FIG. 6 is an illustration of a method of performing surveillance.

DETAILED DESCRIPTION

Figure 1:
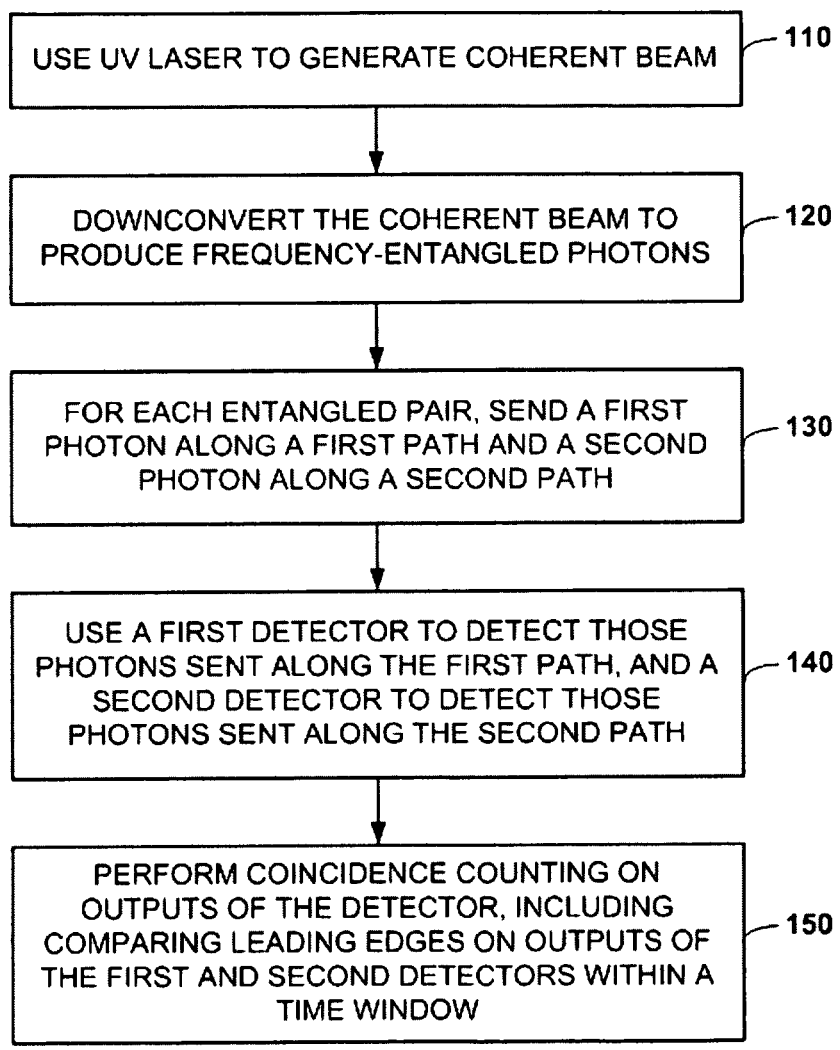
FIG. 1 is an illustration of a method of generating and detecting pairs of frequency-entangled photons.

Reference is made to FIG. 1, which illustrates a method of generating and detecting frequency-entangled photons. Frequency entanglement refers to a quantum mechanical phenomenon in which two photons have different wavelengths that are correlated. The photons can be physically separated, yet still preserve the entanglement of the frequencies. For example, if the total energy of a bi-photon system is $\epsilon_{12} = \epsilon_1 + \epsilon_2$, then the knowledge of $\epsilon_1$ also immediately gives $\epsilon_2$ and vice versa, and the energy $\epsilon$ of any photon is inversely proportional to its wavelength. The photons may be degenerate, that is have equal energy ($\epsilon_1 = \epsilon_2$,) or they may be non-degenerate, that is $\epsilon_1 \neq \epsilon_2$.

At block 110, an ultraviolet (UV) laser is used to generate a coherent beam. The UV region is from about 200-400 nm. For example, the UV laser may generate a coherent beam having a wavelength of 400 nm. The laser may be operated in continuous wave operation.

At block 120, the coherent beam is downconverted to produce frequency-entangled photons. Conservation of energy requires that one photon at a shorter wavelength produces two photons at longer wavelength. Thus the frequency of each produced photon will sum to the frequency of the original photon. For example, a photon at 400 nm may downconverted to produce two degenerate entangled photons, each at 800 nm.

The photon pairs may be degenerate or non-degenerate. The photon pairs are produced one photon pair at a time.

At block 130, for each entangled pair of photons, a first photon is sent along a first path and a second photon is sent along a second path. In some embodiments, an object along the first path will scatter the first photons. The second path should not disturb entanglement.

At block 140, a first detector is used to detect those photons sent along the first path, and a second detector is used to detect those photons sent along the second path. The first and second detectors are operated in a single photon regime. That is, each detector detects only one photon at a time. The pairing comes from receiving a single photon in two separate detectors. Each detector outputs a pulse when a photon is detected.

At block 150, coincidence counting is performed on outputs of the detectors. The coincidence counting includes comparing leading edges of the pulses outputted by the first and second detectors.

Reference is made briefly to FIG. 3. Pulses on outputs of the first and second detectors are referenced by letters A and B. A time window $\Delta \tau$ begins at time $t_1$, and ends at time $t_3$. Time $t_1$ corresponds to the occurrence of the leading edge of pulse B. If the leading edge of pulse A occurs between times $t_1$ and $t_3$, the detected pair of photons is considered coincident.

Consider an example in which 500 entangled pairs are produced per second. One pair will be generated on the average of every two milliseconds. The time window $\Delta \tau$ will be less than two milliseconds. If the leading edge of pulse A occurs within the time window $\Delta \tau$, the detected pair of photons is coincident, and a coincidence count will result.

An electronic device is used to determine whether the leading edge of pulse A occurs within the time window $\Delta \tau$.

The start and duration of the time window Δτ is determined in part by the speed at which the electronic device can accurately compare the leading edges.

The start and duration of the time window Δτ is in part a function of anticipated arrival time of pulse A. A larger time window Δτ will increase the likelihood of identifying coincident photons. As a result, an image will be generated faster. However, the resulting image will have lower (noisier) resolution. If the intervals are smaller, more time will be taken to generate an image, and it will be harder to detect photons that are coincident. However, the resulting image will have a higher resolution.

The start of the time window Δτ may or may not occur when the second detector actually detects a photon. In some embodiments, one path may be substantially longer than the other path. To ensure coincidence in these embodiments, the shorter path is given the same effective length as the longer path. Several examples of giving the shorter path the same effective length is described below in connection with FIG. 2.

The method of FIG. 1 can produce entangled photons at higher power, higher speed of production, better duty cycle and higher efficiency than pulsed operation of a Ti-Sapphire laser. In continuous wave operation, there is no duty cycle derating.

The method of FIG. 1 involves only a single non-linear downconversion, from the lasing wavelength to the wavelengths of the entangled photons. In contrast, a system performing upconversion and then subsequent downconversion would require two non-linear optical shifts. Since each shift reduces efficiency of photon generation, the method of FIG. 1 is more efficient.

A continuous wave UV laser operating at less than full power can still produce 500 photon pairs per second, an order of magnitude higher than other systems. Operating at full power, ten times as many photon pairs could be produced per second.

Detection of leading edges is faster than time-amplitude measurements. Defining the timing window by edges on the electronics allows for much smaller windows instead of waiting for the electronics to turn the window off.

A method herein is not limited to a UV laser. A laser operating in a different regime may be selected, provided that nonlinear crystals downconvert well at the selected wavelength and that available single photon detectors work at the downconverted wavelength.

In the preferred embodiment, a UV laser is used in combination with avalanche photodiodes. Efficiency of current silicon detectors such as avalanche photodiodes drops off below 900 nm and cuts off at about 1 micron (1000 nm). Peak efficiency occurs at 850-900 nm. The downconverted wavelength for avalanche photodiodes may be in the 700-800 nanometer range, which is produced by a UV laser, or a very short wavelength visible (deep purple.). The downconverted wavelength is not in the 850-900 nm range, but it is close enough. Available 400 nm lasers have good operating characteristic, such as good power, good stability, and long operating lifetime.

A laser could instead be operated in pulse mode. However, the laser would have to be controlled to produce one entangled pair at a time without large delays between pairs.

Figure 2:
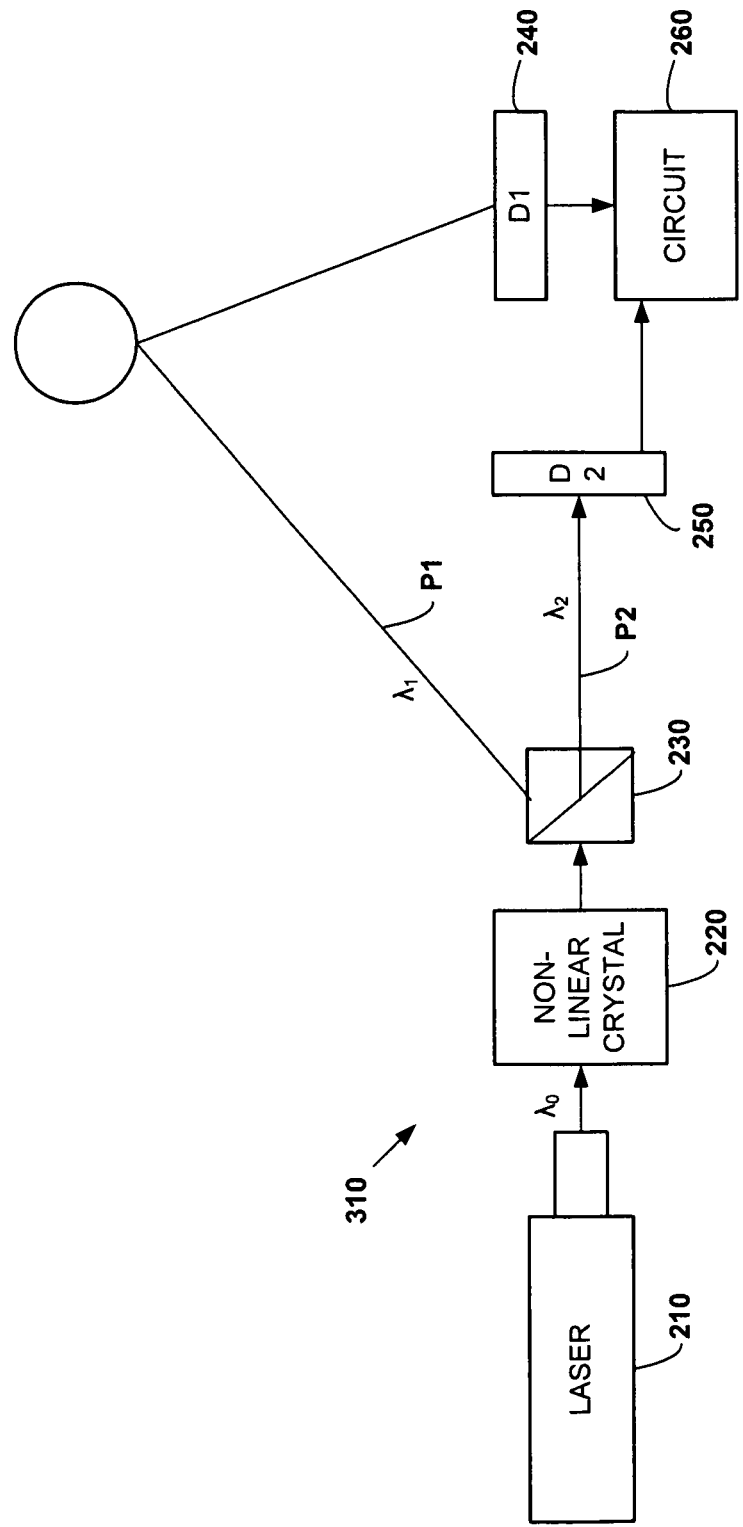
FIG. 2 is an illustration of a system for generating and detecting pairs of frequency-entangled photons.

Reference is made to FIG. 2, which illustrates a system 200 for generating and detecting entangled photon pairs. A laser 210 generates a coherent beam at wavelength $\lambda_0$. The beam illuminates a non-linear crystal 220, which performs downconversion to generate two photons at $\lambda_1$ and $\lambda_2$. Phase-matching conditions require that $$\frac{1}{\lambda_0} = \frac{1}{\lambda_1} + \frac{1}{\lambda_2} \text{ and } \vec{k}_0 = \vec{k}_1 + \vec{k}_2.$$

The specific wavelength is obtained by varying the angle of the crystal 330 relative to the incoming beam.

In other embodiments, downconversion may be performed by periodically poled Lithium Niobate (PPNL). In still other embodiments, downconversion may be performed by any of the following techniques, which include but are not limited to parametric down conversion (PDC); four-wave mixing in photonic crystals (see, for example, de Dood et al. "Nonlinear Photonic Crystals as a Source of Entangled Photons," PhysRevLett.93.050405, 2004); use of micro-structured fibers to generate highly confined electromagnetic fields (see, for example, Sharping et al, "Quantum-correlated twin photons from microstructure fiber," Optics Express 3086, vol. 12, no. 14, 2004); semiconductor quantum wells (see, for example, Hayat et. al., "High-Rate Entanglement Source via Two-Photon Emission from Semiconductor Quantum Wells" arXiv quant-ph/0612124, 2006); quantum dot structures (see, for example, Stevenson et. al., "A semiconductor source of triggered entangled photon pairs" Nature, vol. 439, pp. 179-82, 2006); and bright sources of dichromatic photons (see, for example, Pelton et al., "Bright, single-spatial-mode source of frequency non-degenerate, polarization-entangled photon pairs using periodically poled KTP" Optical Express 3573, vol. 12, no. 15, 2004).

A device 230 sends the photons having wavelength $\lambda_1$ down a first path P1 and the photons having wavelength $\lambda_2$ down a second path P2. If the entangled photons are non-degenerate (i.e., $\lambda_1 \neq \lambda_2$), the device 230 may be a wavelength beam splitter. If the entangled photons are degenerate (i.e., $\lambda_1 = \lambda_2$), the device 230 may be an intensity beam splitter or polarizer.

If an object lies in the first path P1, the object will be illuminated by the photons having the first frequency. If so illuminated, the object will scatter the photons having the first frequency.

The second path should not disturb the entanglement. For example, the second path P2 may be long and unobscured, it may be short and in a controlled environment, etc.

A first detector 240 is positioned to detect the photons scattered by the object. A second detector 250 detects photons sent along the second path. Both detectors 240 and 250 are capable of counting individual photons. A detector 240 or 250 may be a single detector across which the photons are scanned, a linear array across which photons are scanned, or a 2-D array that does not require scanning. Each detector 240 and 250 senses an electromagnetic field and outputs phase and amplitude of the sensed field.

In some embodiments, these single photon-counting detectors 240 and 250 may be photomultipliers, which use the photo-electric effect, combined with a series of electron multipliers. In other embodiments, avalanche photodiodes may be used. Avalanche photodiodes are much smaller than photomultipliers (solid—state detectors versus glass tubes) and are more easily shielded against background noise sources. In order to detect single photons, an avalanche photodiode is reverse biased above the breakdown voltage. When a photon is absorbed, the diode forms a conductive channel. Because there is an inherent capacitance to the diode, a surface charge, typically involving $10^8$ charges will be present. These charges will all be discharged simultaneously, creating the output pulse representing the detection of the photon.

A coincidence circuit 260 determines whether photons detected by the detectors 240 and 250 are coincident.

Additional reference is made to FIG. 4, which illustrates an example of a circuit 260 for performing coincidence detection on the outputs A and B of the first and second detectors 240 and 250. The circuit 260 includes rising-edge triggered flip flops 410 and 420 for compare the leading edges of pulses A and B generated by the first and second detectors 240 and 250.

Additional reference is made to FIG. 3. The leading edge of pulse B occurs at time $t_1$, and the leading edge of pulse A occurs at time $t_2$. Pulse C is a timing pulse that is generated by the circuit 260. The time window $\Delta\tau$ starts at time $t_1$ and ends at time $t_3$, which corresponds to the leading edge of the timing pulse C. FIG. 3 also shows that the leading edge of pulse A occurs within the time window $\Delta\tau$. Therefore, a coincidence output pulse D is generated.

In some embodiments, the duration of the time window is fixed. The window starts at time $t_1$, and ends a fixed amount of time later (e.g., 10 ns).

In other embodiments, the duration of the time window is adjustable. As illustrated in FIG. 3, $\Delta\tau_1$ represents time before arrival of the leading edge of pulse A, and $\Delta\tau_2$ represents the time after the arrival of the leading edge of pulse A. The two sides of the time window can be moved independently from one another. That way, peculiarities of the electronics (e.g. the exact shape of the rising edge, shape of the pulse from the detector) will be easier to deal with.

Using D flip-flops, one test showed $\Delta\tau_1$=8 ns, and $\Delta\tau_2$=2 ns, for a time window of about 10 ns. This window can be made wider, and possibly more symmetric. The speed of the circuit 260 does not come from the speed of the flip flops 410 and 420, but rather from the use of edge detection in generating the time windows. Since the circuit 260 of FIG. 4 uses only two flip flops 410 and 420, their relative turn on edges create the windows, so the windows are only limited by the rise time of the flip flop gate.

Reference is once again made to FIG. 2. The system 200 can ensure coincidence by giving the paths P1 and P2 the same effective length. In some embodiments, photons along the shorter path can be optically delayed so the pulses reach the circuit 260 at roughly the same time. As a first example, photons along the second path P2 can be delayed optically by adding mirrors and forcing the photons to travel over a longer distance. As a second example, photons along the second path P2 can be delayed optically by inserting an optical element with a refractive index>1 in the second path P2. This will slow the photons transmitted through the element.

In some embodiments, the circuit 260 can ensure coincidence by generating internal timing synchronization. For example, the circuit 260 can measure the time delay between the arrival of the photons of interest by doing a cross correlation measurement between the photons of a certain desired narrow wavelength. There will be a peak (i.e., showing many coincidences) at the appropriate delay time between the two channels.

Generation of the frequency-entangled photons is not limited to photons having only two different frequencies. Photons having three, four or more frequencies may be generated and used.

For example, the so called "N00N States" can be used in the second path P2. A N00N state is the quantum-mechanical entangled state described by the equation:

$$|\phi_{NOON}\rangle = |N\rangle_a |0\rangle_b + e^{i\theta}|0\rangle_a |N\rangle_b,$$

This equation represents a superposition of N particles in mode a with zero particles in mode b, and vice versa. When using a N00N state of N photons, the resolution is proportional to Lambda/N. where lambda is the photon wavelength. Thus, imaging resolution is better for higher order N00N states. The photons may be generated in an $N^{th}$ order N00N state, where N≥2.

Figure 7:
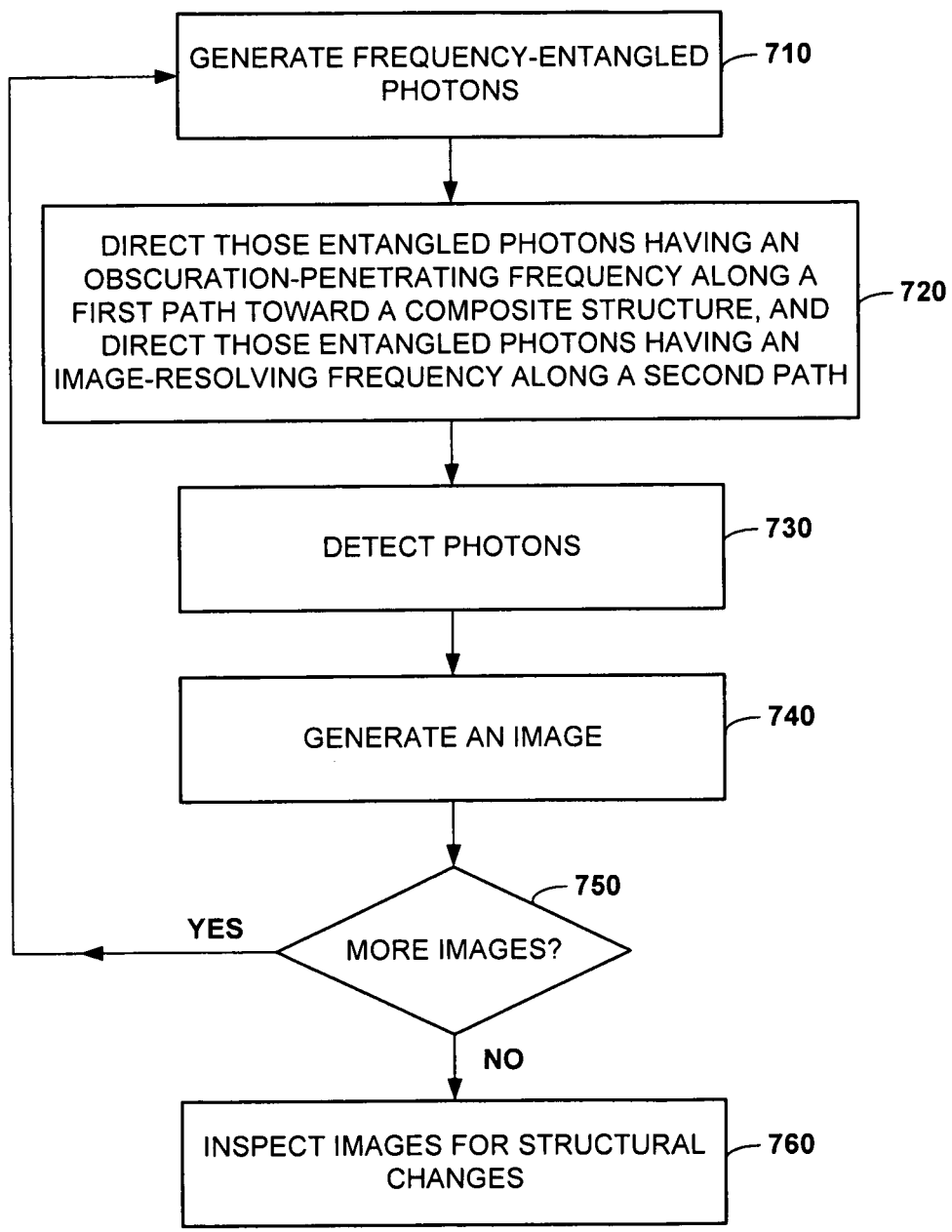
FIG. 7 is an illustration of a method of performing non-destructive inspection.

A method herein is not limited to any particular use. Examples include, but are not limited to, sensing and communications. FIGS. 5-7 provide examples of different sensing methods: tracking, surveillance, and nondestructive inspection (NDI).

Imaging with frequency-entangled photons offers numerous advantages. Photon entanglement can extend imaging capability beyond the traditionally observed limits for classical light. It can produce images that may be hard to get due to lack of resolution or excess noise. Due to entanglement, the image may have a higher resolution than it would have had the image been formed only by the photons having the first frequency.

A method and system herein can produce entangled photons at a higher rate; therefore, more signal can be collected. The resulting imaging has improved resolution or faster image generation, or some combination of both.

Wavelengths of the photons sent down the first path can be selected to penetrate obscurations, such as clouds and walls. Moreover, those wavelengths can be different than the wavelength of the photons that determine the imaging resolution.

A method herein can also produce images with low illumination because it operates in the single photon regime. Normally, imaging requires shining a light on a target (also known as active imaging) and looking for return light. Consequently, a target may know it is being sensed. With photon level probing, however, an object can be sensed covertly.

An image can be formed in a correlation plane by performing a second order correlation of the photons' complex electric fields detected by the first and second detectors. Coincidence counts are mapped as a function of the x-y coordinates of the second detector 240. Coincidence counting measures the time average of the product of the complex electric field measured at the first detector 230 times the complex electric field measured at the second detector 240. The complex electric field can be described in terms of phase and amplitude. An example of computing the second order correlation is described in a paper by Pittman et al., "Two photon geometric optics," The Physical Review A, vol. 53, no. 4, 1996, pp. 2808 and 2813-14.

According to the paper by Pittman et al., coincidence counting rate may be calculated as a function of the transverse spatial parameters involved, and this function may be minimized to obtain the sharpest image. However, the "sharpest" image is not always required. While the sharpest images might be preferred for some embodiments of the present invention, slightly blurry or out of focus images might be suitable for other embodiments.

Reference is made to FIG. 5, which illustrates a method of performing object tracking. The system illustrated in FIG. 2 may be used to track an object. At block 510, an image of an object is acquired using nondegenerate entangled photons. The first frequency is selected so the photons can pass through airborne obscuration and illuminate the object being tracked. If the object is an aircraft or other airborne object, the first frequency is selected to pass through clouds, fog, and other atmospheric obscurants (e.g., turbulence).

To track objects at sea, including objects that are under water, the first frequency is selected to penetrate water. To track land vehicles, the first frequency is selected so the photons can pass through air, dust, smoke, fog and other atmospheric obscuration.

The second frequency may be selected to allow details of the object to be discerned in the acquired image.

A telescope, pointing mirror, or other optical assembly may be used to direct the photons having the first frequency toward the object. Whatever is covered in the field of view of the first detector and in the field of view of the second detector will appear in the acquired image.

At block 520, a processor estimates an expected location for the object being tracked. For example, an object is identified in the acquired image. The object location in the current image is compared to the object location in one or more previously acquired images, and the difference(s) between the locations is used to estimate where the object will be during the next image acquisition. In addition, object recognition may be performed to determine whether the correct object is being tracked (e.g., by comparing the acquired object to a stored reference image).

At block 530, the hardware is adjusted in order to view the object at the expected location. For instance, the telescope, pointing mirror or other optical assembly could be re-oriented to look at the expected location.

The functions in blocks 510, 520 and 530 may be repeated for continuous tracking of the object.

Reference is now made to FIG. 6, which illustrates a method of performing surveillance on an object that is obscured. The hardware illustrated in FIG. 2 may be used to perform the surveillance. At block 610, nondegenerate frequency-entangled photons are generated. At block 620, those photons having a first frequency are directed along a first path toward an obscuration. The frequency of the first beam is selected so the photons pass through the obscuration and illuminate the object or objects behind the obscuration (e.g., walls, windows, and other manmade structures). The frequency can also be selected to anticipate counter-surveillance measures.

Also at block 620, those entangled photons having a second frequency are directed along a second path. The second frequency is selected to provide sufficient image resolution.

At block 630, photons scattered by the obscured object(s) and the photons along the second path are detected. At block 640, an image is generated. The acquired image will reveal details of objects behind the obscuration.

Reference is made to FIG. 7, which illustrates a method of performing non-destructive inspection (NDI) of structures made of composite material. The hardware illustrated in FIG. 2 may be used to perform the NDI. At block 710, nondegenerate frequency-entangled photons are generated. At block 720, those photons having a first wavelength are directed along a path toward the composite structure. Radio frequency waves may be used.

Also at block 720, those photons having an image-resolving wavelength are directed along a second path. The image-resolving frequency may be in the millimeter spectrum to obtain a higher imaging resolution that allows structural changes (e.g., cracks, corrosion) to be identified.

At block 730, the photons are detected. At block 740, an image is generated.

The functions at blocks 710-740 can be repeated to generate different images of different structures (block 750). Moreover, the focus of those photons having the first wavelength can be adjusted to view structures at different depths. For example, a first focus can be used to view structural changes in a composite panel. Then a second focus can be used to view structural changes in a composite member behind the panel.

At block 760, the images are analyzed to identify structural changes in the structures. Structural changes can scatter or block photons. Depending upon the structural change, a structural change might appear in an image as a brighter patch, or a darker one, or a patch having a different texture.

The method of FIG. 7 may be used to perform NDI on certain aircraft structures (panels, stiffeners, ribs, spars, etc.) that are made of a composite material such as carbon-reinforced plastic (CRFP). For instance, the method can be used to identify cracks, corrosion, and other state changes in aircraft structures.

The invention claimed is:

1. A method comprising:
    generating a coherent beam;
    downconverting the coherent beam to produce pairs of frequency-entangled photons;
    for each entangled pair, sending a first photon along a first path and a second photon along a second path;
    using a first detector to detect those photons sent along the first path and a second detector to detect those photons sent along the second path, the detection performed in a single photon regime; and
    performing coincidence counting on outputs of the detectors, including comparing leading edges on the outputs of the first and second detectors within a time window.

2. The method of claim 1, wherein the first and second detectors are operated in a single photon regime.

3. The method of claim 1, wherein the first and second paths are given the same effective length.

4. The method of claim 1, wherein each detector outputs a pulse to indicate detection of a photon; and wherein the start of each time window corresponds to the leading edge of a pulse provided by the second detector.

5. The method of claim 4, wherein sides of the time window are independently adjustable.

6. The method of claim 1, wherein the photons are generated in an $N^{th}$ order N00N state, where $N \geq 2$.

7. The method of claim 1, wherein an image is formed in a correlation plane by performing a second order correlation of the photons' complex electric fields detected by the first and second detector; and mapping coincidence counts as a function of the x-y coordinates of the second detector.

8. A method of tracking an object, comprising using the method of claim 7 to acquire images containing an object; and estimating locations of the object based on the acquired images.

9. The method of claim 8, wherein those photons sent along the first path have a wavelength for passing through airborne obscuration.

10. A method of performing surveillance, the method comprising forming images of the object using the method of claim 7, wherein those photons sent along the first path are directed toward an obscuration and have a wavelength for passing through the obscuration, and wherein the photons passing though the obscuration are scattered by any objects behind the obscuration.

11. A method of performing nondestructive inspection of an object comprising forming an image of the object using the method of claim 7; and
    analyzing the image to identify any structural changes.

12. The method of claim 11, wherein the object is an aircraft structure made of composite material; and wherein the first photons are scattered or blocked by a structural change.

13. The method of claim 11, wherein nondestructive inspection is performed on first and second objects, with the second object being behind the first object, and wherein photons sent along the first path have a first focus while inspecting the first structure and a second focus while inspecting the second structure.

14. The method of claim 1, wherein a UV laser is used to generate the coherent beam.

15. The method of claim 14, wherein the laser is operated in continuous wave mode.

16. A system comprising
- a laser-based system for generating frequency-entangled photon pairs and, for each pair, sending a first photon along a first path and a second photon along a second path;
- a first photon detector for detecting individual photons sent along the first path;
- a second photon detector for detecting individual photons sent along the second path; and
- a circuit, responsive to outputs of the detectors, for counting coincidences of the photon pairs, including determining coincidences by comparing leading edges on outputs of the first and second detectors within a time window.

17. The system of claim 16, wherein the laser-based system includes an ultraviolet laser and a non-linear crystal for down-converting an output of the laser, and wherein the first and second photon detectors include avalanche photodiodes, whereby an upconversion is not performed prior to the down-conversion.

18. The system of claim 16, wherein the laser-based system includes a laser operable in continuous wave mode to generate photon pairs one at a time.

19. The system of claim 16, wherein the circuit includes first and second flip flops for detecting edges of output pulses provided by the first and second detectors, and wherein the circuit generates a coincidence pulse if the edge from the first detector is detected within the time window of the edge of the second detector.

20. The system of claim 19, wherein sides of the time window are independently adjustable.

* * * * *